US012650824B2

(12) United States Patent
Zhang

(10) Patent No.: US 12,650,824 B2
(45) Date of Patent: Jun. 9, 2026

(54) METHODS FOR SOFTWARE ENVIRONMENT DEPLOYMENT AND COMPUTER-READABLE STORAGE MEDIUMS

(71) Applicant: Yangtze Memory Technologies Co., Ltd., Wuhan (CN)

(72) Inventor: Xueshan Zhang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 151 days.

(21) Appl. No.: 18/543,998

(22) Filed: Dec. 18, 2023

(65) Prior Publication Data

US 2025/0053398 A1    Feb. 13, 2025

(30) Foreign Application Priority Data

Aug. 10, 2023   (CN) ......................... 202311014200.8

(51) Int. Cl.
| | |
|---|---|
| *G06F 9/44* | (2018.01) |
| *G06F 8/60* | (2018.01) |
| *G06F 8/71* | (2018.01) |
| *G06F 9/45* | (2006.01) |
| *G06F 9/50* | (2006.01) |

(Continued)

(52) U.S. Cl.
CPC .................. *G06F 8/60* (2013.01); *G06F 8/71* (2013.01); *G06F 13/00* (2013.01)

(58) Field of Classification Search
CPC ... G06F 8/60; G06F 8/71; G06F 13/00; G06F 8/70; G06F 9/44505; G06F 9/50; G06F 11/1441; G06F 21/53; G06F 9/468; G06F 8/65; G06F 9/454; G06F 9/441; G06F 8/35; G06F 9/45558; G06F 8/10; G06F 9/5083; G06F 8/61; H04L 67/34

See application file for complete search history.

(56) References Cited

U.S. PATENT DOCUMENTS

| | | | | |
|---|---|---|---|---|
| 6,570,593 | B1 * | 5/2003 | Bowers | ................... G06F 16/10 |
| | | | | 715/775 |
| 9,747,091 | B1 * | 8/2017 | Berg | ......................... G06F 8/61 |
| 2013/0332901 | A1 * | 12/2013 | Berg | ................... G06F 9/44505 |
| | | | | 717/121 |

\* cited by examiner

*Primary Examiner* — Thuy Dao

(74) *Attorney, Agent, or Firm* — Hanley, Flight & Zimmerman, LLC

(57) ABSTRACT

The present disclosure provides a method for software environment deployment and computer-readable storage medium. The method includes: receiving configuration information, wherein the configuration information includes configuration information for operating system environment and configuration information for application software. A system environment configuration command is generated according to the configuration information for the operating system environment, wherein the system environment configuration command is to instruct a plurality of computers to configure the operating system environment according to the configuration information for the operating system environment. An application software configuration command is generated according to the configuration information for the application software, wherein the application software configuration command is to instruct the plurality of computers to configure the application software according to the configuration information for the application software. The system environment configuration command and the application software configuration command are sent to the plurality of computers.

20 Claims, 9 Drawing Sheets

(51) Int. Cl.
| | | |
|---|---|---|
| *G06F 12/00* | (2006.01) | |
| *G06F 13/00* | (2006.01) | |
| *G06F 21/62* | (2013.01) | |
| *H04L 29/08* | (2006.01) | |

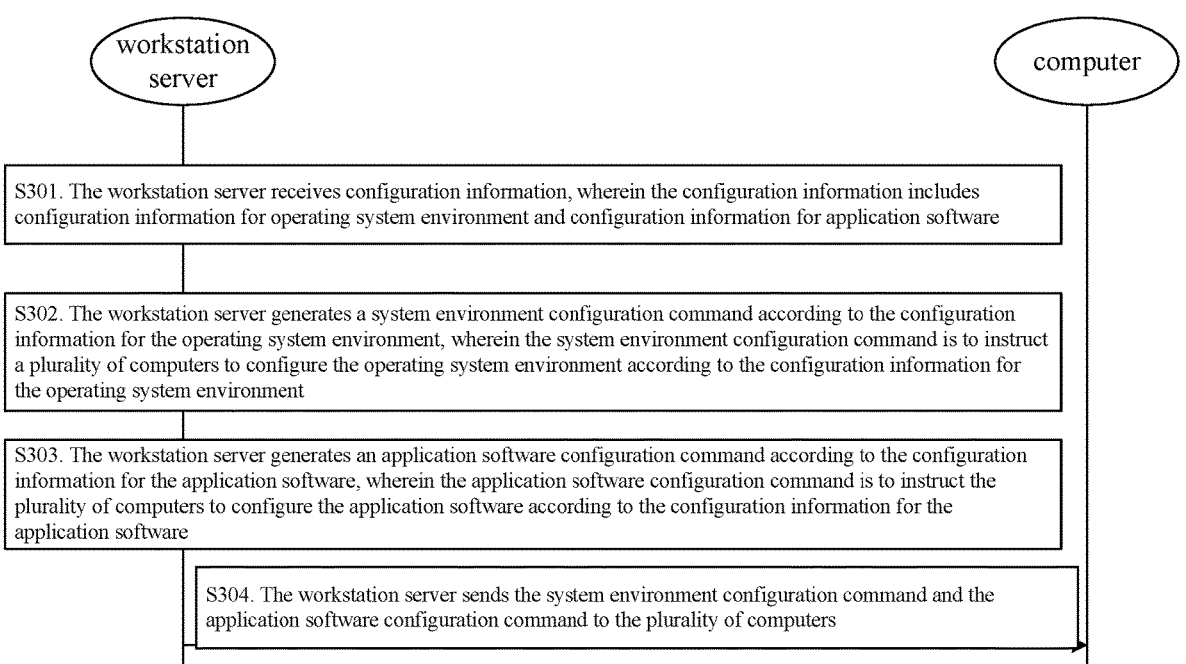

S301. The workstation server receives configuration information, wherein the configuration information includes configuration information for operating system environment and configuration information for application software S302. The workstation server generates a system environment configuration command according to the configuration information for the operating system environment, wherein the system environment configuration command is to instruct a plurality of computers to configure the operating system environment according to the configuration information for the operating system environment S303. The workstation server generates an application software configuration command according to the configuration information for the application software, wherein the application software configuration command is to instruct the plurality of computers to configure the application software according to the configuration information for the application software S304. The workstation server sends the system environment configuration command and the application software configuration command to the plurality of computers

FIG. 3

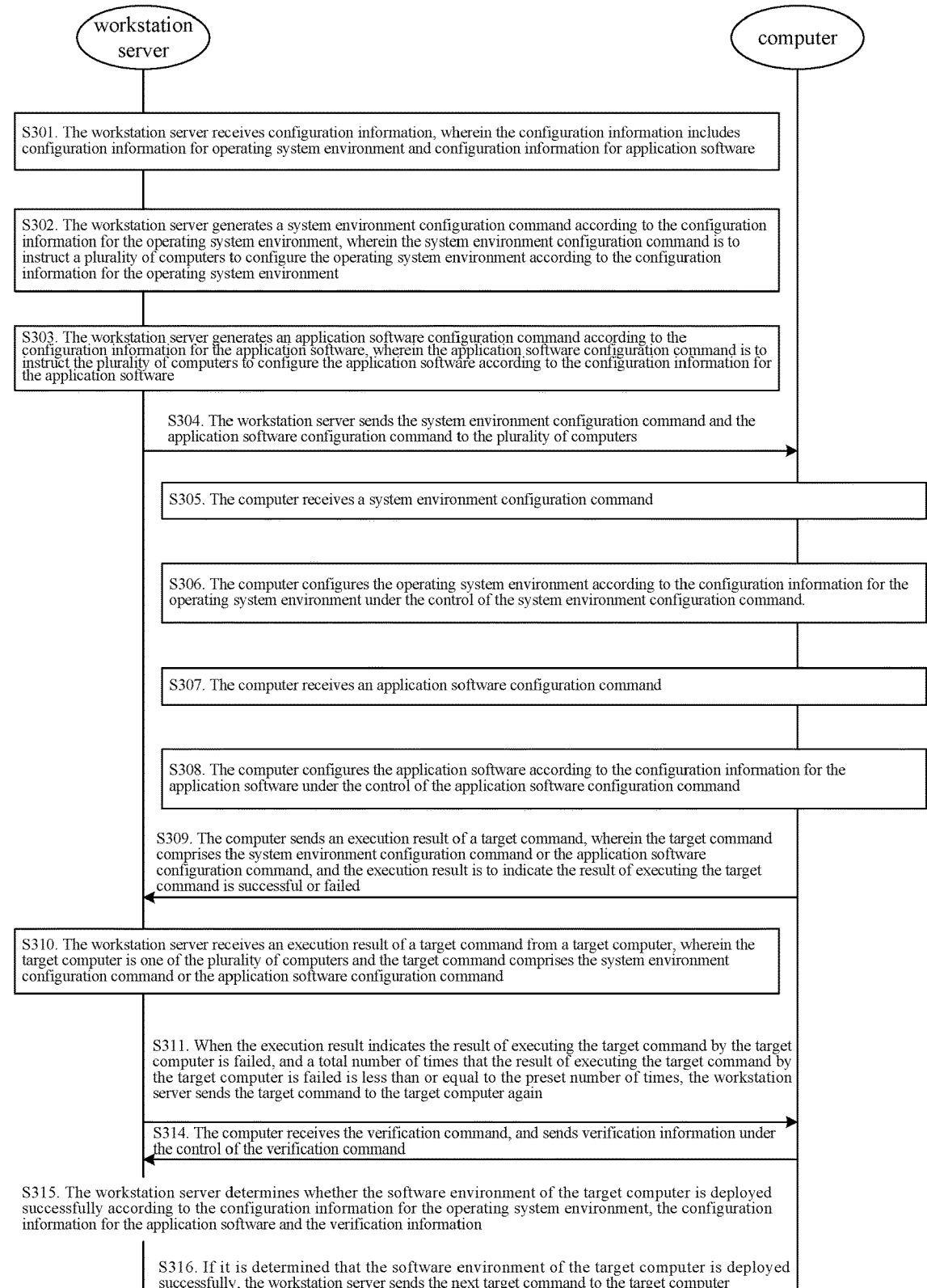

workstation
server computer

S301. The workstation server receives configuration information, wherein the configuration information includes configuration information for operating system environment and configuration information for application software S302. The workstation server generates a system environment configuration command according to the configuration information for the operating system environment, wherein the system environment configuration command is to instruct a plurality of computers to configure the operating system environment according to the configuration information for the operating system environment S303. The workstation server generates an application software configuration command according to the configuration information for the application software, wherein the application software configuration command is to instruct the plurality of computers to configure the application software according to the configuration information for the application software S304. The workstation server sends the system environment configuration command and the application software configuration command to the plurality of computers S305. The computer receives a system environment configuration command S306. The computer configures the operating system environment according to the configuration information for the operating system environment under the control of the system environment configuration command.

S307. The computer receives an application software configuration command

S308. The computer configures the application software according to the configuration information for the application software under the control of the application software configuration command S309. The computer sends an execution result of a target command, wherein the target command comprises the system environment configuration command or the application software configuration command, and the execution result is to indicate the result of executing the target command is successful or failed S310. The workstation server receives an execution result of a target command from a target computer, wherein the target computer is one of the plurality of computers and the target command comprises the system environment configuration command or the application software configuration command S311. When the execution result indicates the result of executing the target command by the target computer is failed, and a total number of times that the result of executing the target command by the target computer is failed is less than or equal to the preset number of times, the workstation server sends the target command to the target computer again S314. The computer receives the verification command, and sends verification information under the control of the verification command S315. The workstation server determines whether the software environment of the target computer is deployed successfully according to the configuration information for the operating system environment, the configuration information for the application software and the verification information S316. If it is determined that the software environment of the target computer is deployed successfully, the workstation server sends the next target command to the target computer S317. The workstation server generates a deployment result report, wherein the deployment result report includes the target command, the execution result, the verification command, and the verification information

FIG. 6 electronic device 900 processor 910 —— memory 920

FIG. 9

METHODS FOR SOFTWARE ENVIRONMENT DEPLOYMENT AND COMPUTER-READABLE STORAGE MEDIUMS

REFERENCE TO RELATED APPLICATIONS

This application claims priority to and the benefit of Chinese Patent Application 202311014200.8, filed on Aug. 10, 2023, which is hereby incorporated by reference in its entirety.

TECHNICAL FIELD

Examples of the present disclosure relate to the field of computer technology, and in particular to a method for software environment deployment and computer-readable storage medium.

BACKGROUND

In order to implement the batch testing of engineering samples, one method is to, in a manual manner, firstly deploy the software environment on multiple test personal computers (PCs) and then place multiple engineering samples on a plurality of test PCs respectively to run test script for testing.

BRIEF DESCRIPTION OF THE DRAWINGS

FIG. 3 is a schematic flowchart of a method for software environment deployment according to some examples;

FIG. 6 is still another schematic flowchart of a method for software environment deployment according to some examples;

FIG. 9 is a schematic structure diagram of an electronic device according to some examples.

DETAILED DESCRIPTION

Figure 1:
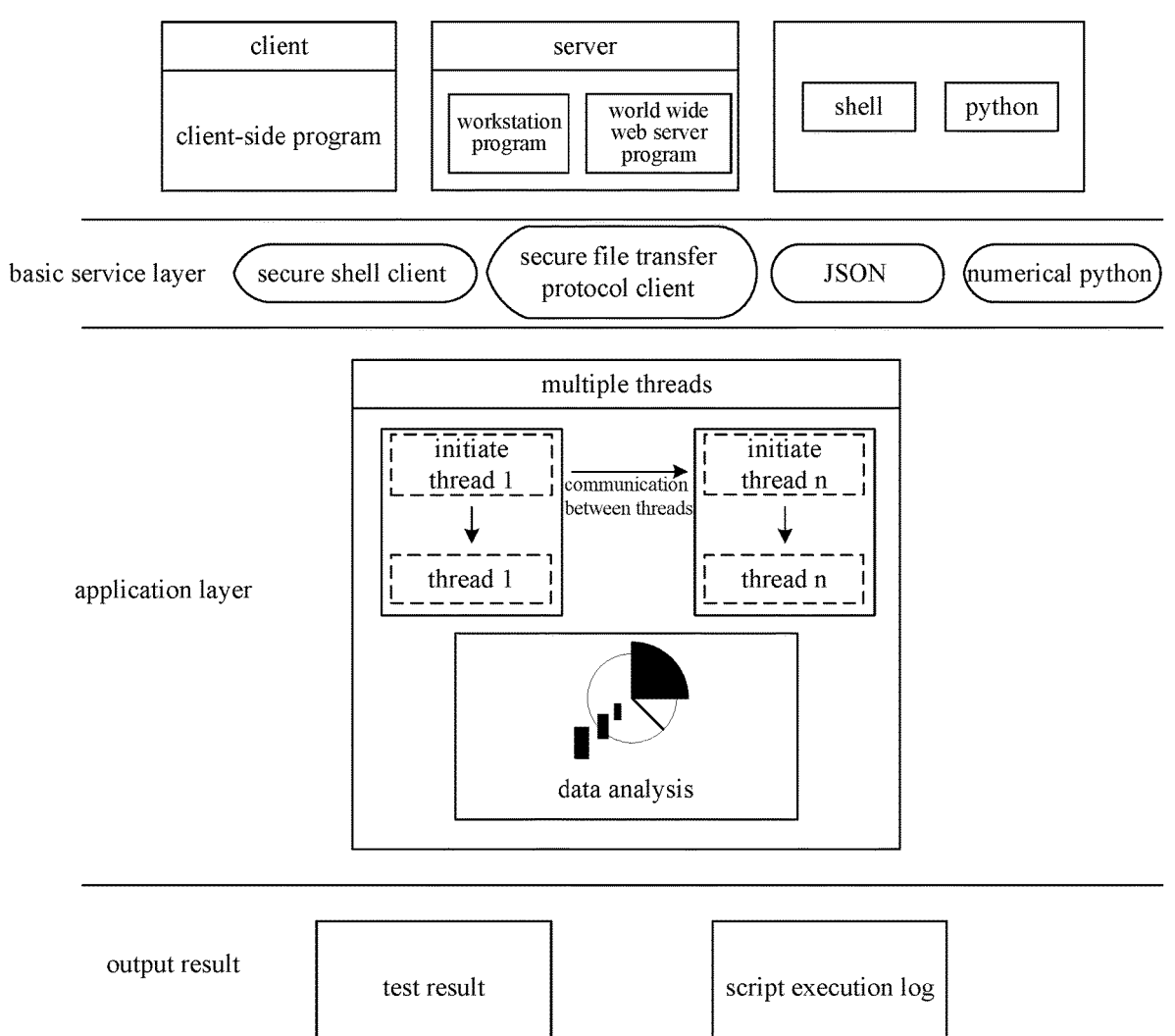
FIG. 1 is a software architecture diagram of a method for software environment deployment according to some examples.

The technical solutions in some examples of the present disclosure will be clearly and completely described below in conjunction with the accompanying drawings, apparently, the described examples are only some, not all of examples of the present disclosure. All other examples obtained by those skilled in the art based on the examples provided in the present disclosure belong to the claimed scope of the present disclosure.

Unless the context requires otherwise, throughout the description and claims, the term "comprising" is interpreted as open and inclusive, i.e., "including, but not limited to". In the description of the present disclosure, the terms "one example", "some examples", "exemplary example", "exemplarily" or "some examples" are intended to indicate that a particular feature, structure, material, or characteristic related to the example is included in at least one example of the present disclosure. Illustrative representations of the terms described above are not necessarily referring to a same example. Furthermore, particular feature, structure, material or characteristic described above may be included in any suitable manner in any one or more examples or examples.

Hereinafter, the terms "first" and "second" are used for descriptive purposes only, and should not be understood as indicating or implying relative importance or implicitly specifying the quantity of indicated technical features. Thus, a feature defined as "first" and "second" may explicitly or implicitly include one or more of these features. In the description of examples of the present disclosure, "plurality" means two or more, unless specified otherwise.

In describing some examples, the expressions "coupled" and "connected" and their derivatives may be used. For example, in describing some examples, the term "connected" may be used to indicate that two or more elements are in direct physical or electrical contact with each other. As another example, in describing some examples, the term "coupled" may be used to indicate that two or more elements are in direct physical or electrical contact. However, the term "coupled" may also mean that two or more elements are not in direct contact with each other, but yet still co-operate or interact with each other. Examples disclosed herein are not necessarily limited by the context herein.

"At least one of A, B and C" has the same meaning as "at least one of A, B or C" and both include the following combinations of A, B and C: only A; only B; only C; combination of A and B; combination of A and C; combination of B and C; and combination of A, B and C.

"A and/or B" includes the following three combinations: only A; only B; only C; and combination of A and B.

The use of "suitable for" or "configured to" herein means open and inclusive language that does not exclude devices that are suitable for or configured to perform additional tasks or operations.

Additionally, the use of "based on" is meant to be open and inclusive, as a process, operation, calculation, or other action that is "based on" one or more stated conditions or values may in practice be based on additional conditions or beyond stated values.

Before introducing examples of the present disclosure, technical terms and background technologies involved in the present disclosure are presented firstly.

Jenkins: an open source continuous integration (CI) tool that provides a friendly operation interface, and may be mainly used for continuous and automatic construction/ testing of software projects and monitoring the operation of external tasks.

Client program (also referred to as a Client): a program that corresponds to the server and provides local services for clients.

Workstation program (also referred to as a Worker): a background thread or process running on a server to perform central processing unit (CPU)-intensive tasks to avoid blocking the main thread.

World Wide Web server program (also referred to as a Sever): a program that provides Web services and may be used to receive a request from a client and return a response.

Paramiko: a Python-based SSH (secure shell) library that may be used to implement functions such as remote command execution, file transfer, and intermediate SSH proxy.

Secure Shell (SSH): a network security protocol which may be used to securely log in and execute commands on a remote computer. It prevents eavesdropping and denial attacks by encrypting communication data, thereby provides high security and confidentiality.

Secure shell client (SSH Client): an application program for connecting with an SSH server, which may be used for remote logging to a remote computer, executing commands and transferring files.

Secure file transfer protocol (SFTP): a SSH protocol-based file transfer protocol, which provides a secure method to transfer files between computers, and more secure than traditional file transfer protocols.

Secure file transfer protocol client (SFTP Client): a client library for file transfer over the SSH protocol, which provides functions such as secure file transfer and remote file management, and may be used in different operations systems and platforms.

Javascript object notation (JSON): a lightweight data exchange format, which may be used in data transmission and storage for Web development.

Numerical python (Numpy): a mathematical library for Python that provides multidimensional array objects, various derived objects (e.g., mask arrays and matrices), and various routines for fast operations of an array, including mathematics, logic, shape operations, sorting, selection, input/output (I/O), discrete Fourier transform, basic linear algebra, basic statistical operations, stochastic simulation, etc.

Mount command: it may be used to connect the file system (e.g., hard disk, storage device or remote file system) to the current system in the Linux system, so that the file system may be accessed and used in the operating system.

In order to quickly and timely find potential problems in the early production stage of products (e.g., NAND flash memory), a standard rack may be used to organize the test PCs, the product to be tested is placed on the test PC, and tools such as Jenkins may be used to invoke scripts for batch testing. When batch testing are performed, it is ensured that the software environment of each test PC is consistent, and the software operating environment of each test PC is synchronized with the developer's local development environment, which may reduce the differences in test results due to different software operating environments, and improve the reliability of test results.

In order to implement batch testing of engineering samples, one method comprises: firstly, in a manual manner, deploying a software environment on a plurality of test PCs to ensure the consistency of the software environment among the test PCs, and the synchronization of the software operating environment of each test PC with the developer's local development environment. Then, multiple engineering samples are installed on a plurality of test PCs and test scripts are run for testing.

However, when a lot of software may be required to be deployed, or the number of test PCs is large, deploying test PCs one by one in a manual manner will consume more manpower and time, therefore resulting in high cost.

In order to solve the problem that when a large number of software is to be deployed, or when the number of test PCs is large, a large amount of manpower and time will be consumed, resulting in high cost, an example of the present disclosure provides a method for software environment deployment, which generates and sends to a plurality of computers, a system environment configuration command and an application software configuration command according to the configuration information, wherein the plurality of computers implement software environment deployment under the control of the two commands, thereby the efficiency of software environment deployment is improved and cost is reduced.

As shown in FIG. 1, FIG. 1 is a software architecture diagram of a method for software environment deployment provided by an example of the present disclosure; The client in the software architecture diagram may be a test PC, and the server is to deploy the software environment at the client. In one example, the client program may be executed by the client, and the workstation program and the world wide web server program may be executed by the server, so as to execute the method for software environment deployment. The workstation program and the world wide web server program may running on a same server, or may running on different servers, which is not limited in examples of the present disclosure. An example of the present disclosure is illustrated by taking the followed example that the server executes a python program, the operating system of the client is a Linux system, and the client executes a shell command.

As shown in the basic service layer, a secure shell client may be remotely connected by using paramiko which is a third-party library of pythons, over the SSH protocol, and the secure file transfer protocol client may be remotely connected over the SFTP protocol, so as to implement upload, download of a file, confirm that whether the file exists, etc. The test results may be saved in JSON lightweight data exchange format. It may also be determined whether a target keyword exists in the output results by using the numerical python to interactively verify the output results of the client and the parameters in the configuration file of the server, and corresponding processing may be further performed according to the determination results.

As shown in the application layer, the server may initiate multiple threads, and the individual threads may communicate with each other, thereby improving the performance and resource utilization of the workstation program and the world wide web server program, e.g., initiate thread 1 to thread n, where n is a positive integer greater than 1. The workstation program at the server may send commands to a client program of a client in each thread, and the client program may execute the command and return the execution result of the command to the workstation program, then the workstation program may perform data analysis according to the execution result of the command to determine whether the command achieves the expected result, thereby implementing the deployment of the software environment.

Figure 2:
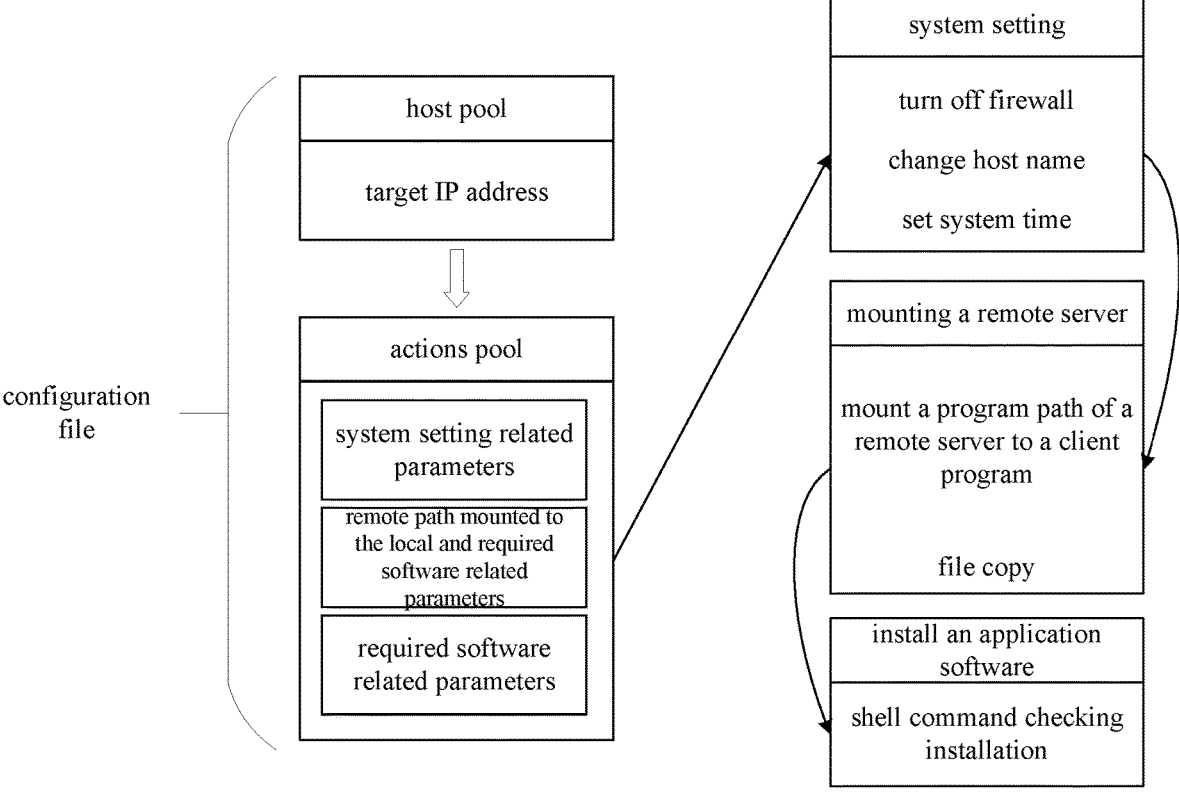
FIG. 2 is another software architecture diagram of a method for software environment deployment according to some examples.

In one example, as shown in FIG. 2. Firstly, the workstation program may generate a host pool based on the relevant parameters in the configuration file at the server, the host pool including multiple target Internet Protocol (IP) addresses, and check the total number of target IP addresses in the host pool and the total number of target execution IP addresses set in the configuration file to avoid some target execution IP addresses being missed in the generated host pool.

Secondly, the workstation program may generate an actions pool based on the relevant parameters in the configuration file, the actions pool includes the relevant parameters of the actions to be achieved, e.g., parameters related to system settings, parameters related to remote path mounted to the local and required software, etc.

Then, the workstation program may initiate multiple threads, and in each thread, based on the parameters in the actions pool, send relevant commands to the client program to achieve operations such as system settings, mounting remote servers, and installing application software. Wherein the operation of system setting includes closing the firewall, modifying the host name and setting the system time. The operation of mounting the remote server includes mounting the program path of the remote server to the client program and file copy. The workstation program may also determine whether the path of the World Wide Web server program is mounted to the client program successfully through the mount command. The operation of installing the application software includes the operation of shell command checking the installation, in one example, the shell command is to check whether the installation is complete, and if the installation is successful, the next operation is continued to be performed, and if the installation fails, perform the operation of uninstall and reinstall. The workstation program may also use Numpy to perform data analyze on the output results of the client program executing the command to determine whether the command achieves the expected result, and if the expected result is achieved, the process ends, and if the expected result is not achieved, the script program is exited with an exception status code to facilitate subsequent manual processing.

Finally, as shown in FIG. 1, the workstation program at the server may output results: a test report and a script execution log. The test report is to indicate the test results of the engineering samples, e.g., the json format may be used to record the results of testing the engineering samples by each test PC in the form of a dictionary. The script execution log is to indicate the abnormalities in the process of executing commands by each test PC, e.g., according to the expected sequence of operations in the configuration file, IP address of each test PC, success or failure of each command execution, and detailed information about the failed operations may be recorded in the form of a dictionary and written into the json file, which facilitates subsequent manual processing or error correction for program scripts (debug).

Optionally, the method for software environment deployment provided by an example of the present disclosure may be applied to a workstation server and a plurality of computers on which a software environment to be deployed, and a system environment configuration command and an application software configuration command may be generated and sent to a plurality of computers by the workstation server according to the configuration information, and the plurality of computers implement software environment deployment under the control of the two commands. Alternatively, the method for software environment deployment may be applied to a plurality of computers on which the software environment is to be deployed, and any one of the plurality of computers may generate and send a system environment configuration command and an application software configuration command to the remaining computers according to the configuration information, and the plurality of computers implement software environment deployment under the control of the two commands. Examples of the present disclosure takes the method applied to a workstation server and a plurality of computers on which a software environment is to be deployed as an example, for an illustrated example.

FIG. 3 is a method for software environment deployment provided by an example of the present disclosure, and the method includes the following operations S301-S304.

S301. The workstation server receives configuration information, wherein the configuration information includes configuration information for operating system environment and configuration information for application software.

The configuration information may be determined by the developer according to the local development environment and the software environment for the computer on which the software environment is to be deployed. The configuration information for the operating system environment is to deploy the operating system parameters of the computer on which the software environment is to be deployed, and the configuration information for the application software is to deploy the software of the computer on which the software environment is to be deployed. In the method for software environment deployment provided by an example of the present disclosure, a developer may centrally modify the parameters in the process of the software environment deployment by modifying the configuration information, making the modification more convenient.

Figure 4:
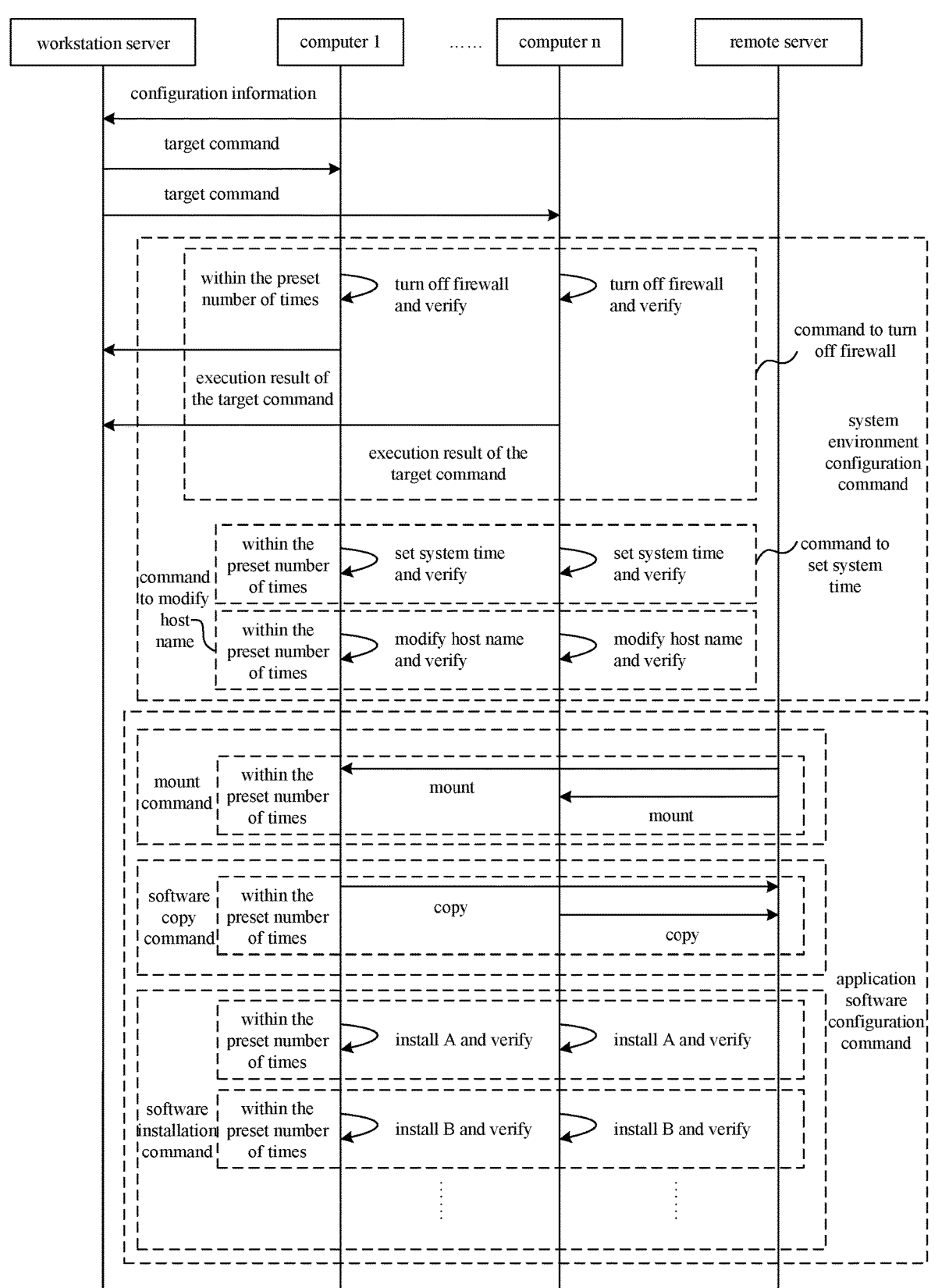
FIG. 4 is another schematic flowchart of a method for software environment deployment according to some examples.

In a possible example, as shown in FIG. 4, take the above workstation program running on the workstation server and the world wide web server program running on the remote server as an example. A configuration file may be stored in a remote server, and the workstation server may receive configuration information sent by the remote server.

S302. The workstation server generates a system environment configuration command according to the configuration information for the operating system environment, wherein the system environment configuration command is to instruct a plurality of computers to configure the operating system environment according to the configuration information for the operating system environment.

In one possible example, the configuration information for the operating system environment includes configuration information for a firewall, a preset time and a preset host name, and the configuration information for the firewall is to indicate to turn off the firewall, the system environment configuration command includes at least one of the following: a command to turn off a firewall, a command to set system time and a command to modify a host name. The command to turn off a firewall is to instruct the plurality of computers to turn off the firewall, the command to set system time is to instruct the plurality of computers to set the system time according to the preset time, and the command to modify a host name is to instruct the plurality of computers to modify the host name according to the preset host name.

S303. The workstation server generates an application software configuration command according to the configuration information for the application software, wherein the application software configuration command is to instruct the plurality of computers to configure the application software according to the configuration information for the application software.

In one possible example, the configuration information for the application software includes storage address information for the application software, and the storage address information is to indicate the address at which install pack of the application software is stored in the remote server. The application software configuration command includes a mount command, which is to instruct a plurality of computers to mount the address indicated by the storage address information. The workstation server generating an application software configuration command according to the configuration information for the application software includes: the workstation server generating a mount command according to the storage address information. The method for software environment deployment provided by an example of the present disclosure may copy install pack of the application software more conveniently through storing install pack of the application software in a remote server.

In one possible example, the configuration information for the application software further includes software identification information for the application software. The application software configuration command further includes a software copy command, the software copy command is to instruct the plurality of computers to: copy install pack of the application software corresponding to the software identification information to the local according to the storage address information. The workstation server generating an application software configuration command according to the configuration information for the application software further includes: the workstation server generating the software copy command according to the storage address information and the software identification information.

In one possible example, before the workstation server generating the software copy command according to the storage address information and the software identification information, the method further includes: the workstation server storing install pack of the application software corresponding to the software identification information to the address indicated by the storage address information in the remote server.

In one possible example, the application software configuration command further includes a software installation command, and the software installation command is to instruct the plurality of computers to install the application software corresponding to the software identification information. The workstation server generating an application software configuration command according to the configuration information for the application software further includes: the workstation server generating a software installation command according to the software identification information.

S304. The workstation server sends the system environment configuration command and the application software configuration command to the plurality of computers.

In one possible example, the configuration information further includes IP address information for the plurality of computers, and the workstation server sending the system environment configuration command and the application software configuration command to the plurality of computers includes: the workstation server sending the system environment configuration command and the application software configuration command to the plurality of computers according to the IP address information for the plurality of computers.

Optionally, the IP address information for the plurality of computers described above may include IP network segments for the plurality of computers, or may include host IP ranges for the plurality of computers, which are not limited in examples of the present disclosure.

In one possible example, the workstation server sending the system environment configuration command and the application software configuration command to the plurality of computers includes: the workstation server initiating multiple threads, wherein in each of the threads, sending the system environment configuration command and the application software configuration command to at least one of the plurality of computers. Examples of the present disclosure do not limit the number of the multiple threads and the number of the at least one computer.

For example, as shown in FIG. 4, the workstation server may initiate n threads, and send a target command to n computers in the n threads, the target command includes a system environment configuration command or an application software configuration command, where n is a positive integer greater than 1. The method for software environment deployment provided by examples of the present disclosure, through initiating multiple threads and sending the system environment configuration command and the application software configuration command to at least one of the plurality of computers, may improve efficiency of software environment deployment, and may improve resource utilization.

In one possible example, the configuration information further includes a first value, and the first value is to indicate the number of computers that are to be allocated with IP addresses, and before the workstation server sending the system environment configuration command and the application software configuration command to the plurality of computers according to the IP address information for the plurality of computers, the method further includes: the workstation server determining a second value according to the IP address information, wherein the second value is to indicate the number of IP addresses which are allocated to the plurality of computers; determining whether an error occurs in the configuration information according to the first value and the second value.

For example, taking the following as an example: the number of a plurality of computers to be configured with the software environment is 10, 10 computers are to be allocated with 10 IP addresses, and the first value is 10. When the workstation server determines 6 IP addresses according to the IP address information, it may be understood that the number of IP addresses which are allocated to the 10 computers is 6, and the second value is 6, and the workstation server may determine that the IP address information in the configuration information is incorrect according to the first value of 10 and the second value of 6. Further, the workstation server may prompt a developer or a tester to check whether the IP address information in the configuration information is incorrect, and determine whether the 10 computers to be configured with the software environment are missed.

A method for software environment deployment is provided by an example of the present disclosure, wherein firstly a workstation server receives configuration information, and the configuration information includes configuration information for operating system environment and configuration information for application software. Then, the workstation server generates a system environment configuration command according to the configuration information for the operating system environment, and an application software configuration command is generated according to the configuration information for the application software. Finally, the workstation server sends the system environment configuration command and the application software configuration command to a plurality of computers, and the plurality of computers implement software environment deployment under the control of the two commands. Compared with deploying test PCs one by one in a manual manner, deployment efficiency of the software environment is improved and the cost is reduced. Moreover, the method for software environment deployment provided by examples of the present disclosure may avoid differences in the software environments of a plurality of computers, reduce the differences in test results caused by different software operating environments, and improve reliability of test results.

Figure 5:
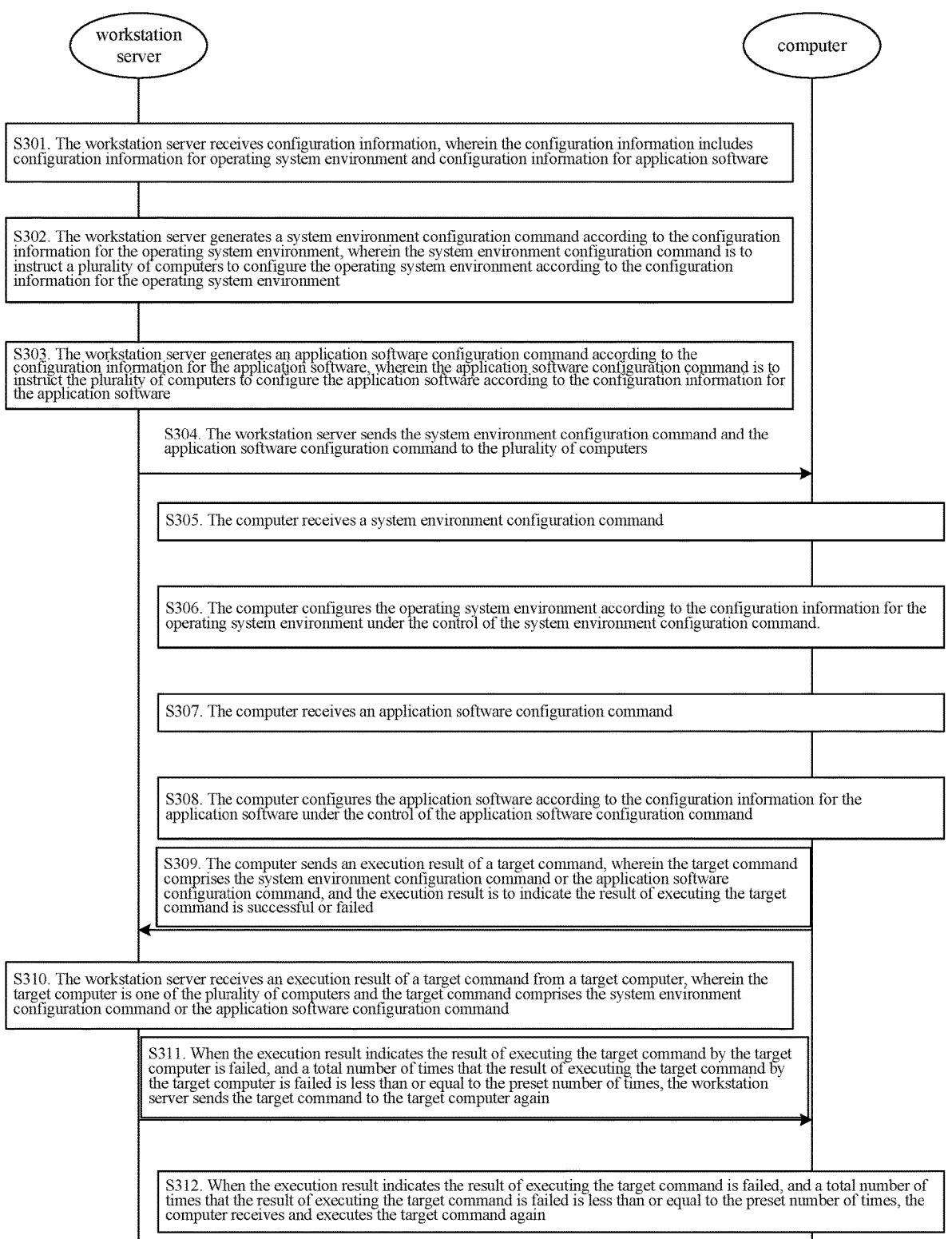
FIG. 5 is yet another schematic flowchart of a method for software environment deployment according to some examples.

In a possible example, as shown in FIG. 5, the method for software environment deployment provided by an example of the present disclosure further includes operations S305-S308 after the operation S304 described above.

S305. The computer receives a system environment configuration command. The system environment configuration command is a command generated according to the configuration information for the operating system environment in the configuration information, wherein the system environment configuration command is to instruct a plurality of computers to configure the operating system environment according to the configuration information for the operating system environment.

For example, as shown in FIG. 4, any one of computers 1–n may receive the system environment configuration command.

S306. The computer configures the operating system environment according to the configuration information for the operating system environment under the control of the system environment configuration command.

For example, as shown in FIG. 4, computers 1–n may turn off the firewall under the control of the command to turn off firewall, and may also set the system time under the control of the command to set system time, and may also modify the name of the host under the control of the command to modify a host name, which will not be repeated in examples of the present disclosure.

S307. The computer receives an application software configuration command. The application software configuration command is a command generated according to the configuration information for the application software in the configuration information, and wherein the application software configuration command is to instruct the plurality of computers to configure the application software according to the configuration information for the application software.

S308. The computer configures the application software according to the configuration information for the application software under the control of the application software configuration command.

In one possible example, the configuration information for the application software includes storage address information for the application software, and the storage address information is to indicate the address at which install pack of the application software is stored in the remote server. The application software configuration command includes a mount command, which is to instruct a plurality of computers to mount the address indicated by the storage address information. The computer configuring the application software according to the configuration information for the application software under the control of the application software configuration command includes: the computer mounting the address indicated by the storage address information under the control of the mount command.

In one possible example, the configuration information for the application software further includes software identification information for the application software. The application software configuration command further includes a software copy command, the software copy command is to instruct the plurality of computers to: copy install pack of the application software corresponding to the software identification information to the local according to the storage address information. The computer configuring the application software according to the configuration information for the application software under the control of the application software configuration command further includes: the computer copying install pack of the application software corresponding to the software identification information to the local according to the storage address information under the control of the software copy command.

In one possible example, the application software configuration command further includes a software installation command, and the software installation command is to instruct the plurality of computers to install the application software corresponding to the software identification information. The computer configuring the application software according to the configuration information for the application software under the control of the application software configuration command further includes: the computer installing the application software corresponding to the software identification information under the control of the software installation command.

For example, as shown in FIG. 4, computers 1–n may mount the address indicated by the storage address information under the control of the mount command, and may also copy install pack of the application software corresponding to the software identification information to the local according to the storage address information under the control of the software copy command, and may also install the application software corresponding to the software identification information under the control of the software installation command. In one example, an A application software corresponding to the software identification information may be installed under the control of an A software installation command, and a B application software corresponding to the software identification information may be installed under the control of a B software installation command.

In the method for software environment deployment provided by an example of the present disclosure, each of the plurality of computers may receive a system environment configuration command, the operating system environment is configured according to the configuration information for the operating system environment under the control of the system environment configuration command, and each computer may also receive an application software configuration command, the application software is configured according to the configuration information for the application software under the control of the application software configuration command, such that the software environment deployment of the plurality of computers is implemented. Compared with deploying test PCs one by one in a manual manner, deployment efficiency of the software environment is improved and the cost is reduced.

In a possible example, as shown in FIG. 5, the configuration information also includes a preset number of times, and examples of the present disclosure do not limit the value of the preset number of times, and the method for software environment deployment provided by an example of the present disclosure further includes operations S309-S312 after the operation S308 described above.

S309. The computer sends an execution result of a target command, wherein the target command comprises the system environment configuration command or the application software configuration command, and the execution result is to indicate the result of executing the target command is successful or failed. Examples of the present disclosure do not limit the target command to be a system environment configuration command or an application software configuration command.

For example, as shown in FIG. 4, each of the computers 1 to n may send the execution result of the system environment configuration command to the workstation server.

S310. The workstation server receives an execution result of a target command from a target computer, wherein the target computer is one of the plurality of computers and the target command comprises the system environment configuration command or the application software configuration command. The execution result is to indicate the result of executing the target command by the target computer is successful or failed.

Optionally, the target computer may be any one of a plurality of computers, which is not limited in examples of the present disclosure.

For example, taking the target computer being computer 1 and the target command being a system environment configuration command as an example, as shown in FIG. 4, the workstation server may receive the execution result sent by the computer 1, and the execution result may be to indicate the result of executing the system environment configuration command by the computer 1 is successful or failed.

S311. When the execution result indicates the result of executing the target command by the target computer is failed, and a total number of times that the result of executing the target command by the target computer is failed is less than or equal to the preset number of times, the workstation server sends the target command to the target computer again.

For example, taking the preset number of times being 2 as an example, when the execution result indicates that the result of executing the system environment setting command by the computer 1 is failed, and a total number of times that the result of executing the system environment setting command by the computer 1 is failed is 1, which is less than the preset number of times of 2, the workstation server sends the system environment setting command to the computer 1 again.

In a possible example, when the execution result indicates the result of executing the target command by the target computer is failed, and a total number of times that the result of executing the target command by the target computer is failed is greater than the preset number of times, the workstation server stops sending the target command to the target computer.

S312. When the execution result indicates the result of executing the target command is failed, and a total number of times that the result of executing the target command is failed is less than or equal to the preset number of times, the computer receives and executes the target command again.

For example, taking the preset number of times being 2 as an example, when the execution result indicates the result of executing the system environment setting command by the computer 1 is failed, and a total number of times that the result is failed is 1 which is less than the preset number of times of 2, the computer 1 may receive and execute the system environment setting command again.

In the method for software environment deployment provided by an example of the present disclosure, the preset number of times is set in the configuration information, and when the workstation server determines, according to the execution result, that the result of executing the target command by the target computer is failed, and a total number of times that the result of executing the target command by the target computer is failed is less than or equal to the preset number of times, the target command is sent to the target computer again, so that the target computer executes the target command again. Therefore, in the scenario where the computer may execute the target command successfully through repeatedly executing the target command, e.g., in the scenario where the execution of the target command fails due to network instability, the target command may be executed successfully without manual operation, and the deployment efficiency of the software environment may be improved.

In a possible example, as shown in FIG. 6, the method for software environment deployment provided by an example of the present disclosure further includes operations S313-S316 after the operation S310 described above.

S313. When the execution result indicates that the target computer executes the target command successfully, the workstation server sends the verification command to the target computer. The verification command is to instruct the target computer to send verification information, and the verification information includes: the storage address of the application software mounted by the target computer, version information for the installed application software and information for the operating system environment of the target computer.

As another example, as shown in FIG. 4, when the execution result indicates that the computer 1 executes the mount command successfully, the workstation server may send a verification command to the computer 1, and the verification command may be a mount command, and the verification command is to instruct the computer 1 to send verification information, where the verification information may include the storage address of the application software mounted by the computer 1.

As another example, as shown in FIG. 4, when the execution result indicates that the computer 1 executes the software installation command successfully, the workstation server may send a verification command to the computer 1, and the verification command may be "pip list|grep cryptogaphy", and the verification command is to instruct computer 1 to send verification information, the verification information may include version information for the installed application software, e.g., "cryptography 2.5", where "cryptography" is the identification of the application software, and "2.5" is the version information for the application software.

S314. The computer receives the verification command, and sends verification information under the control of the verification command.

For example, as shown in FIG. 4, computer 1 may receive a verification command, and under the control of the verification command, send verification information to the workstation server.

S315. The workstation server determines whether the software environment of the target computer is deployed successfully according to the configuration information for the operating system environment, the configuration information for the application software and the verification information.

Wherein whether the software environment of the target computer is deployed successfully includes: whether the storage address of the application software mounted by the target computer is consistent with the storage address information, whether the version information for the application software installed on the target computer is consistent with the version information for the application software corresponding to the software identification information, and whether the information for the operating system environment of the target computer is consistent with the configuration information for the operating system environment.

In one example, the workstation server determines whether the software environment of the target computer is deployed successfully according to the configuration information for the operating system environment, the configuration information for the application software and the verification information includes many possible examples, and an example of the present disclosure takes as the following as an example for illustrated description: the workstation server determines whether the software environment of the target computer is deployed successfully according to whether the version information for the application software installed on the target computer is consistent with the version information for the application software corresponding to the software identification information.

For example, as shown in FIG. 4, taking the computer 1 sending verification information, this verification information including the version information for the installed application software as an example, when the workstation server determines that the version information for the application software installed on the computer 1 is consistent with the version information for the application software corresponding to the software identification information according to the configuration information and verification information for the application software, the workstation server may determine that the software environment of the computer 1 is deployed successfully.

In a possible example, the workstation server may determine, through numpy, whether the software environment of the target computer is deployed successfully.

For example, as shown in FIG. 4, taking the verification information sent by computer 1 including the version information for the installed application software, e.g., "cryptography 2.5", as an example, the workstation server may convert the "cryptography 2.5" into an array type ['cryptography', '2.5'], and determine whether the software environment of the computer 1 is deployed successfully through confirming whether the array is consistent with the version information for the application software corresponding to the software identification information.

S316. If it is determined that the software environment of the target computer is deployed successfully, the workstation server sends the next target command to the target computer.

In one example, if the workstation server determines that the software environment of the target computer is deployed successfully, the workstation server sends the next target command to the target computer, and if the workstation server determines that the software environment deployment of the target computer fails, the workstation server stops sending the target command to the target computer.

In the method for software environment deployment provided by an example of the present disclosure, firstly the workstation server sends a verification command to the target computer when the execution result indicates the result of executing the target command by the target computer is successful, the verification command is to instruct the target computer to send verification information. Then, the workstation server determines whether the software environment of the target computer is deployed successfully according to the configuration information for the operating system environment, the configuration information for the application software and the verification information. Finally, if it is determined that the software environment of the target computer is deployed successfully, the workstation server sends the next target command to the target computer. Through verifying whether the target computer executes the target command successfully for two times during the process of the target computer deploying the software environment, the reliability of the software environment deployment may be improved.

In a possible example, as shown in FIG. 6, the method for software environment deployment provided by an example of the present disclosure further includes operation S317, and an example of the present disclosure takes operation S317 being included after the operation S316 described above as an example for illustrated description.

S317. The workstation server generates a deployment result report, wherein the deployment result report includes the target command, the execution result, the verification command, and the verification information.

For example, as shown in FIG. 4, the workstation server may generate a deployment result report, which may include the IP address information for computers 1–n, the target command that is sent to each computer, the execution result of each computer executing the target command, the verification command that is sent to each computer, and the verification information returned by each computer executing the verification command. Therefore, when any computer fails to be deployed, the computer which fails to be deployed may be quickly determined through the IP address information in the deployment result report, and subsequent manual processing or error correction for program scripts may be facilitated according to the target command, the execution result, the verification command, and the verification information in the deployment result.

The method for software environment deployment provided by an example of the present disclosure may facilitate subsequent manual processing or error correction for program scripts through generating a deployment result report, wherein the deployment result report includes the target command, the execution result, the verification command, and the verification information.

Figure 7:
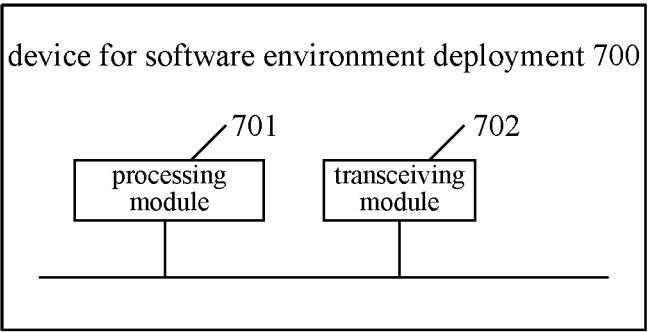
FIG. 7 is a schematic structural diagram of a device for software environment deployment according to some examples.

As shown in FIG. 7, an example of the present disclosure further provides a device for software environment deployment 700, the device for software environment deployment 700 may include the workstation server in the example described above, and the device for software environment deployment 700 may be used to implement the method for software environment deployment in any of the examples described above.

The device for software environment deployment 700 includes: a processing module 701 and a transceiving module 702. In one example, the processing module 701 is to control and manage the actions of the device for software environment deployment 700, and is to perform the processing performed by the device for software environment deployment 700 in the examples described above. The transceiving module 702 is to support the device for software environment deployment to receive configuration information, and to send a system environment configuration command and an application software configuration command. Optionally, if the device for software environment deployment 700 includes a storage unit, the processing module 701 may also execute programs or instructions stored in the memory, so that the device for software environment deployment 700 implements a method and function mentioned in any of the examples described above.

In one example, the processing module 701 described above may be used to perform, e.g., operations S302-S303 in FIG. 3, and/or other processes for the technology described herein. The transceiving module 702 may be used to perform, e.g., operations S301, S304 in FIG. 3, and/or other processes for the technology described herein. Wherein, all relevant content in each of operations involved in the method example described above may be referred to the function description of the corresponding function module, and will not be repeated here.

In one example, in the aspect of hardware implementation, the function of the processing module 701 may be implemented by a processor, and the function of the transceiving module 702 may be implemented by a transceiver (transmitter/receiver) and/or a communication interface, wherein, the processing module 701 may be embedded in or independent of the processor of the device for software environment deployment 700 in the form of hardware, and may also be stored in the memory of the device for software environment deployment 700 in the form of software, so that the processor may invoke and execute the operations corresponding to the functional units described above.

Figure 8:
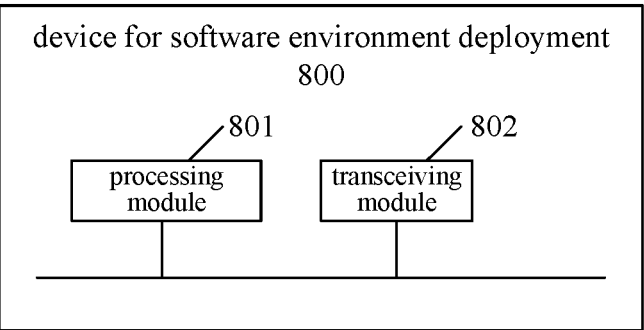
FIG. 8 is another schematic structural diagram of a device for software environment deployment according to some examples.

FIG. 8 illustrates a schematic structural diagram of a device for software environment deployment 800, the device for software environment deployment 800 may include the computer in the example described above, and the device for software environment deployment 800 may be used to implement the method for software environment deployment in any of the examples described above.

The device for software environment deployment 800 includes: a processing module 801 and a transceiving module 802. In one example, the transceiving module 802 is to support the device for software environment deployment to receive a system environment configuration command and to receive an application software configuration command. The processing module 801 is to control and manage the actions of the device for software environment deployment 800, and is to perform the processing performed by the device for software environment deployment 800 in the examples described above. Optionally, if the device for software environment deployment 800 includes a storage unit, the processing module 801 may also execute programs or instructions stored in the memory, so that the device for software environment deployment 800 implements a method and function involved in any of the examples described above.

In one example, the processing module 801 described above may be used to perform, e.g., operations S306, S308 in FIG. 5, and/or other processes for the technology described herein. The transceiving module 802 may be used to perform, e.g., operations S305, S307, S309, S312 in FIG. 5, and/or other processes for the technology described herein. Wherein, all relevant content in each of operations involved in the method example described above may be referred to the function description of the corresponding function module, and will not be repeated here.

In one example, in the aspect of hardware implementation, the function of the transceiving module 802 may be implemented by a transceiver (transmitter/receiver) and/or a communication interface, and the function of the processing module 801 may be implemented by a processor, wherein, the processing module 801 may be embedded in or independent of the processor of the device for software environment deployment 800 in the form of hardware, and may also be stored in the memory of the device for software environment deployment 800 in the form of software, so that the processor may invoke and execute the operations corresponding to the functional units described above.

Figure 9:
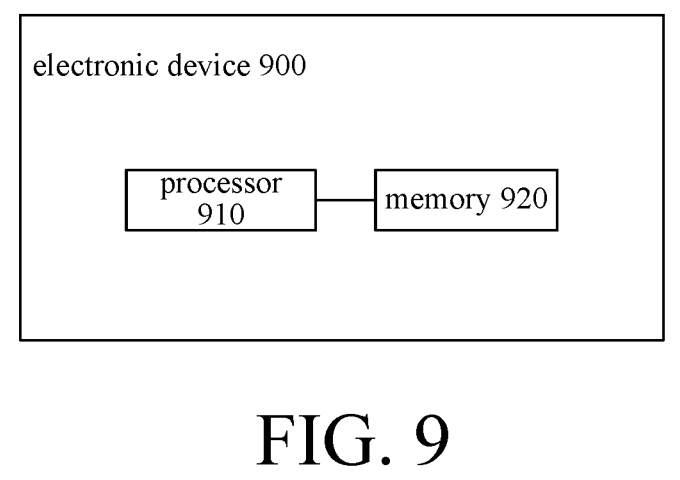

As shown in FIG. 9, an example of the present disclosure further provides an electronic device 900, where the electronic device 900 includes a processor 910 and a memory 920 coupled to the processor 910. The electronic device 900 may include the workstation server described above, or may include the computer described above, which is not limited in examples of the present application.

In a possible example, the processor 910 described above may include a central processing unit.

In a possible example, when the electronic device 900 is the workstation server described above, instructions may be stored in the memory 920, and the processor 910 may execute the instructions, so that the electronic device 900 executes the operations corresponding to the workstation server in the system call method shown in FIG. 3, FIG. 5 or FIG. 6.

In a possible example, when the electronic device 900 is the computer described above, instructions may be stored in the memory 920, and the processor 910 may execute the instructions, so that the electronic device 900 executes the operations corresponding to the computer in the system call method shown in FIG. 3, FIG. 5 or FIG. 6.

An example of the present disclosure also provides a computer-readable storage medium, the computer-readable storage medium stores a computer program, and the computer program, when runs on the processor, causes the processor to execute the operations corresponding to the workstation server in the system call method shown in FIG. 3, FIG. 5 or FIG. 6, or to execute the operations corresponding to the computer in the system call method shown in FIG. 3, FIG. 5 or FIG. 6.

The detailed description of the method for software environment deployment described above and the analysis of beneficial effects may be referenced to the device for software environment deployment 700, the device for software environment deployment 800, and the computer-readable storage medium, and examples of the present application will not repeat them here.

Examples of the present disclosure provide a method for software environment deployment and computer-readable storage medium, which solve the problem that when a large amount of software is to be deployed, or when the number of test PCs is large, more manpower and time will be consumed, resulting in high cost.

In order to achieve the above purpose, examples of the present disclosure employ the following technical solutions:

In an aspect, a method for software environment deployment is provided, the method includes: firstly, receiving configuration information, wherein the configuration information includes configuration information for operating system environment and configuration information for application software. Then a system environment configuration command is generated according to the configuration information for the operating system environment, wherein the system environment configuration command is to instruct a plurality of computers to configure the operating system environment according to the configuration information for the operating system environment. An application software configuration command is generated according to the configuration information for the application software, wherein the application software configuration command is to instruct the plurality of computers to configure the application software according to the configuration information for the application software. Finally, the system environment configuration command and the application software configuration command are sent to the plurality of computers.

The method for software environment deployment provided by an example of the present disclosure includes, firstly, receiving configuration information, wherein the configuration information includes configuration information for operating system environment and configuration information for application software. Then, a system environment configuration command is generated according to the configuration information for the operating system environment, and an application software configuration command is generated according to the configuration information for the application software. Finally, the system environment configuration command and the application software configuration command are sent to a plurality of computers, and the plurality of computers implement software environment deployment under the control of the two commands. Compared with deploying test PCs one by one in a manual manner, deployment efficiency of the software environment is improved and the cost is reduced. Moreover, the method for software environment deployment provided by examples of the present disclosure may avoid differences among the software environments of a plurality of computers, reduce the differences in test results caused by different software operating environments, and improve reliability of test results.

In some examples, the configuration information further includes network protocol IP address information for the plurality of computers, and sending the system environment configuration command and the application software configuration command to the plurality of computers includes: sending the system environment configuration command and the application software configuration command to the plurality of computers according to the IP address information for the plurality of computers.

The method for software environment deployment provided by examples of the present disclosure, through sending system environment configuration commands and application software configuration commands to a plurality of computers according to the IP address information for a plurality of computers, may improve the efficiency of software environment deployment and reduce cost, and may avoid differences among the software environments of a plurality of computers, reduce the differences in test results caused by different software operating environments, and improve reliability of test results.

In some examples, sending the system environment configuration command and the application software configuration command to the plurality of computers includes: initiating multiple threads, wherein in each of the threads, sending the system environment configuration command and the application software configuration command to at least one of the plurality of computers.

The method for software environment deployment provided by examples of the present disclosure, through initiating multiple threads and sending the system environment configuration command and the application software configuration command to at least one of the plurality of computers, may improve efficiency of software environment deployment, and may improve resource utilization.

In some examples, the configuration information further includes a first value which is to indicate the number of computers that are to be allocated with IP addresses, and before sending the system environment configuration command and the application software configuration command to the plurality of computers according to the IP address information for the plurality of computers, the method further includes: determining a second value according to the IP address information, wherein the second value is to indicate the number of IP addresses which are allocated to the plurality of computers; determining whether an error occurs in the configuration information according to the first value and the second value.

The method for software environment deployment provided by examples of the present disclosure may determine, according to the first value and the second value, whether an error occurs in the configuration information, thereby may determine whether a computer which the software environment is to be deployed on is missed.

In some examples, the configuration information for the application software includes storage address information for the application software, and the storage address information is to indicate the address at which install pack of the application software is stored in the remote server. The application software configuration command includes a mount command, which is to instruct a plurality of computers to mount the address indicated by the storage address information. Generating an application software configuration command according to the configuration information for the application software includes: generating a mount command according to the storage address information.

The method for software environment deployment provided by an example of the present disclosure may copy install pack of the application software more conveniently through storing install pack of the application software in a remote server.

In some examples, the configuration information for the application software further includes software identification information for the application software. The application software configuration command further includes a software copy command, the software copy command is to instruct the plurality of computers to: copy install pack of the application software corresponding to the software identification information to the local according to the storage address information. Generating an application software configuration command according to the configuration information for the application software includes: generating a software copy command according to the storage address information and the software identification information.

In some examples, before generating the software copy command according to the storage address information and the software identification information, the method further includes: storing install pack of the application software corresponding to the software identification information to the address indicated by the storage address information in the remote server.

In some examples, the application software configuration command further includes a software installation command, and the software installation command is to instruct the plurality of computers to install the application software corresponding to the software identification information. Generating an application software configuration command according to the configuration information for the application software includes: generating a software installation command according to the software identification information.

In some examples, the configuration information further includes a preset number of times, and the method further includes: receiving an execution result of a target command from a target computer, wherein the target computer is one of the plurality of computers and the target command comprises the system environment configuration command or the application software configuration command, and the execution result is to indicate the result of executing the target command by the target computer is successful or failed. When the execution result indicates the result of executing the target command by the target computer is failed, and a total number of times that the result of executing the target command by the target computer is failed is less than or equal to the preset number of times, the target command is sent to the target computer again.

In the method for software environment deployment provided by an example of the present disclosure, the preset number of times is set in the configuration information, and when it is determined that the result of executing the target command by the target computer is failed according to the execution result, and a total number of times that the result of executing the target command by the target computer is failed is less than or equal to the preset number of times, the target command is sent to the target computer again, so that the target computer executes the target command again. Therefore, in the scenario where the computer may execute the target command successfully through repeatedly executing the target command, e.g., in the scenario where the execution of the target command fails due to network instability, the target command may be executed successfully without any manual operation, and the deployment efficiency of the software environment may be improved.

In some examples, the method further includes: when the execution result indicates the result of executing the target command by the target computer is successful, sending a verification command to the target computer, the verification command is to instruct the target computer to send verification information. Wherein the verification information includes: the storage address of the application software mounted by the target computer, version information for the installed application software and information for the operating system environment of the target computer.

It is determined whether the software environment of the target computer is deployed successfully according to the configuration information for the operating system environment, the configuration information for the application software, and the verification information, whether the software environment of the target computer is deployed successfully includes: whether the storage address of the application software mounted by the target computer is consistent with the storage address information, whether the version information for the application software installed on the target computer is consistent with the version information for the application software corresponding to the software identification information, and whether the information for the operating system environment of the target computer is consistent with the configuration information for the operating system environment.

If it is determined that the software environment of the target computer is deployed successfully, the next target command is sent to the target computer.

The method for software environment deployment provided by an example of the present disclosure firstly sends a verification command to the target computer when the execution result indicates the result of executing the target command by the target computer is successful, the verification command is to instruct the target computer to send verification information. Then, it is determined whether the software environment of the target computer is deployed successfully, according to the configuration information for the operating system environment, the configuration information for the application software and the verification information. Finally, if it is determined that the software environment of the target computer is deployed successfully, the next target command is sent to the target computer. Through verifying twice whether the target computer executes the target command successfully during the process of the target computer deploying the software environment, the reliability of the software environment deployment may be improved.

In some examples, the method further includes: generating a deployment result report, wherein the deployment result report includes the target command, the execution result, the verification command, and the verification information.

The method for software environment deployment provided by an example of the present disclosure may facilitate subsequent manual processing or error correction for program scripts through generating the deployment result report, wherein the deployment result report includes the target command, the execution result, the verification command, and the verification information.

In some examples, the configuration information for the operating system environment includes configuration information for a firewall, a preset time and a preset host name, and the configuration information for the firewall is to indicate to turn off the firewall, the system environment configuration command includes at least one of the following: a command to turn off a firewall, a command to set system time and a command to modify a host name, the command to turn off a firewall is to instruct the plurality of computers to turn off the firewall, the command to set system time is to instruct the plurality of computers to set the system time according to the preset time, and the command to modify a host name is to instruct the plurality of computers to modify the host name according to the preset host name.

In another aspect, a method for software environment deployment is also provided, the method includes: receiving a system environment configuration command, the system environment configuration command is a command generated according to the configuration information for the operating system environment in the configuration information, wherein the system environment configuration command is to instruct a plurality of computers to configure the operating system environment according to the configuration information for the operating system environment. The operating system environment is configured according to the configuration information for the operating system environment under the control of the system environment configuration command; receiving an application software configuration command, wherein the application software configuration command is a command generated according to the configuration information for the application software in the configuration information, and wherein the application software configuration command is to instruct a plurality of computers to configure the application software according to the configuration information for the application software. The application software is configured according to the configuration information for the application software under the control of the application software configuration command.

In some examples, the configuration information for the application software includes storage address information for the application software, and the storage address information is to indicate the address at which install pack of the application software is stored in the remote server. The application software configuration command includes a mount command, which is to instruct a plurality of computers to mount the address indicated by the storage address information. Configuring the application software according to the configuration information for the application software under the control of the application software configuration command includes: mounting the address indicated by the storage address information under the control of the mount command.

In some examples, the configuration information for the application software further includes software identification information for the application software; and the application software configuration command further includes a software copy command, the software copy command is to instruct the plurality of computers to: copy install pack of the application software corresponding to the software identification information to the local according to the storage address information. Configuring the application software according to the configuration information for the application software under the control of the application software configuration command further includes: copying install pack of the application software corresponding to the software identification information to the local according to the storage address information under the control of the software copy command.

In some examples, the application software configuration command further includes a software installation command, and the software installation command is to instruct the plurality of computers to install the application software corresponding to the software identification information. Configuring the application software according to the configuration information for the application software under the control of the application software configuration command further includes: installing the application software corresponding to the software identification information under the control of the software installation command.

In some examples, the configuration information further includes a preset number of times, the method further includes: sending an execution result of a target command, wherein the target command comprises the system environment configuration command or the application software configuration command, and the execution result is to indicate the result of executing the target command is successful or failed. When the execution result indicates the result of executing the target command is failed, and a total number of times that the result of executing the target command is failed is less than or equal to the preset number of times, the target command is received and executed again.

In some examples, the method further includes: receiving a verification command, and sending verification information under the control of the verification command, wherein the verification information including: storage address of the mounted application software, version information for install pack of the installed application software, and information for the operating system environment.

In some examples, the configuration information for the operating system environment includes configuration information for a firewall, a preset time and a preset host name, and the configuration information for the firewall is to indicate to turn off the firewall, the system environment configuration command includes at least one of the following: a command to turn off a firewall, a command to set system time and a command to modify a host name, the command to turn off a firewall is to instruct the plurality of computers to turn off the firewall, the command to set system time is to instruct the plurality of computers to set the system time according to the preset time, and the command to modify a host name is to instruct the plurality of computers to modify the host name according to the preset host name.

In yet another aspect, a computer-readable storage medium that stores a computer program is provided, the computer program, when being runned on a processor, causes the processor to perform the method for software environment deployment provided in any of the aforementioned aspects, or perform the method for software environment deployment provided in another aspect.

It may be understood that for the method for software environment deployment provided in an aspect of the example of the present disclosure described above and the computer-readable storage medium provided in another aspect, the beneficial effects of which that may be achieved may refer to the beneficial effects of the method for software environment deployment provided in an aspect described above, and will not be repeated here.

The above is only some implementations of the present disclosure, but the claimed scope of the present disclosure is not limited thereto, and changes or substitutions within the technical scope disclosed in the present disclosure shall fall within the claimed scope of the present disclosure. Therefore, the claimed scope of the present disclosure should be determined by the claimed scope of the claims.

What is claimed is:

1. A method for software environment deployment, comprising:

receiving configuration information, wherein the configuration information includes configuration information for an operating system environment and configuration information for an application software, wherein the configuration information for the application software includes storage address information for the application software which is to indicate an address at which an install pack of the application software is stored in a remote server;

generating a system environment configuration command according to the configuration information for the operating system environment, wherein the system environment configuration command is to instruct a plurality of computers to configure the operating system environment according to the configuration information for the operating system environment;

generating an application software configuration command according to the configuration information for the application software, wherein the application software configuration command is to instruct the plurality of computers to configure the application software according to the configuration information for the application software, wherein generating the application software configuration command according to the configuration information for the application software includes generating a mount command according to the storage address information, wherein the application software configuration command includes the mount command which is to instruct the plurality of computers to mount the address indicated by the storage address information; and sending the system environment configuration command and the application software configuration command to the plurality of computers.

2. The method of claim 1, wherein the configuration information further includes network protocol IP address information for the plurality of computers, and the sending the system environment configuration command and the application software configuration command to the plurality of computers includes sending the system environment configuration command and the application software configuration command to the plurality of computers according to the network protocol IP address information for the plurality of computers.

3. The method of claim 2, wherein the configuration information further includes a first value which is to indicate a number of the plurality of computers which are to be allocated with IP addresses, and before the sending the system environment configuration command and the application software configuration command to the plurality of computers according to the network protocol IP address information for the plurality of computers, the method further includes:

determining a second value according to the network protocol IP address information, wherein the second value is to indicate a number of IP addresses which are allocated to the number of the plurality of computers; and determining whether an error occurs in the configuration information according to the first value and the second value.

4. The method of claim 1, wherein the sending the system environment configuration command and the application software configuration command to the plurality of computers includes initiating multiple threads, wherein in each of the multiple threads, sending the system environment configuration command and the application software configuration command to at least one of the plurality of computers.

5. The method of claim 1, wherein the configuration information for the application software further includes software identification information for the application software, the application software configuration command further includes a software copy command which is to instruct the plurality of computers to copy the install pack of the application software corresponding to the software identification information to a local deployment environment according to the storage address information, and the generating the application software configuration command according to the configuration information for the application software further includes generating the software copy command according to the storage address information and the software identification information.

6. The method of claim 5, wherein, before generating the software copy command according to the storage address information and the software identification information, the method further comprises storing the install pack of the application software corresponding to the software identification information to the address indicated by the storage address information in the remote server.

7. The method of claim 5, wherein the application software configuration command further includes a software installation command which is to instruct the plurality of computers to install the application software corresponding to the software identification information, and the generating the application software configuration command according to the configuration information for the application software further includes generating the software installation command according the software identification information.

8. The method of claim 7, wherein the configuration information further includes a preset number of times, and the method further comprises:

receiving an execution result of a target command from a target computer, wherein the target computer is one of the plurality of computers, and the target command comprises the system environment configuration command or the application software configuration command, and the execution result is to indicate a result of executing the target command by the target computer is successful or failed; and when the execution result indicates that the result of executing the target command by the target computer is failed and a total number of times that the result of executing the target command by the target computer is failed is less than or equal to the preset number of times, sending the target command to the target computer again.

9. The method of claim 8, further comprising:

when the execution result indicates the result of executing the target command by the target computer is successful, sending a verification command to the target computer, the verification command is to instruct the target computer to send verification information, the verification information includes a storage address of the application software mounted by the target computer, version information for the installed application software, and information for the operating system environment of the target computer; and determining whether a software environment of the target computer is deployed successfully according to the configuration information for the operating system environment, the configuration information for the application software, and the verification information, wherein whether the software environment of the target computer is deployed successfully includes: whether the storage address of the application software mounted by the target computer is consistent with the storage address information, whether the version information for the application software installed on the target computer is consistent with the version information for the application software corresponding to the software identification information, and whether the configuration information for the operating system environment of the target computer is consistent with the configuration information for the operating system environment; and if it is determined that the software environment of the target computer is deployed successfully, sending a next target command to the target computer.

10. The method of claim 9, further comprises generating a deployment result report which includes the target command, the execution result, the verification command, and the verification information.

11. The method of claim 1, wherein the configuration information for the operating system environment includes:

configuration information for a firewall which is to indicate to turn off the firewall, a preset time, and a preset host name, and the system environment configuration command includes at least one of:

a command to turn off the firewall which is to instruct the plurality of computers to turn off the firewall, a command to set system time which is to instruct the plurality of computers to set the system time according to the preset time, and a command to modify a host name which is to instruct the plurality of computers to modify the host name according to the preset host name.

12. A method for software environment deployment, comprising:

receiving a system environment configuration command, the system environment configuration command generated according to configuration information for an operating system environment included in configuration information, wherein the system environment configuration command is to instruct a plurality of computers to configure the operating system environment according to the configuration information for the operating system environment;

configuring the operating system environment according to the configuration information for the operating system environment under the control of the system environment configuration command;

receiving an application software configuration command, the application software configuration command generated according to configuration information for application software included in the configuration information, and wherein the application software configuration command is to instruct the plurality of computers to configure the application software according to the configuration information for the application software, wherein the configuration information for the application software includes storage address information for the application software which is to indicate an address at which an install pack of the application software is stored in a remote server, the application software configuration command includes a mount command which is to instruct the plurality of computers to mount the address indicated by the storage address information, and configuring the application software according to the configuration information for the application software under the control of the application software configuration command includes mounting the address indicated by the storage address information under the control of the mount command; and configuring the application software according to the configuration information for the application software under the control of the application software configuration command.

13. The method of claim 12, wherein the configuration information for the application software further includes software identification information for the application software, the application software configuration command further includes a software copy command which is to instruct the plurality of computers to copy the install pack of the application software corresponding to the software identification information to a local deployment environment according to the storage address information, and configuring the application software according to the configuration information for the application software under the control of the application software configuration command further includes copying the install pack of the application software corresponding to the software identification information to the local deployment environment according to the storage address information under the control of the software copy command.

14. The method of claim 13, wherein the application software configuration command further includes a software installation command which is to instruct the plurality of computers to install the application software corresponding to the software identification information, and configuring the application software according to the configuration information for the application software under the control of the application software configuration command further includes installing the application software corresponding to the software identification information under the control of the software installation command.

15. The method of claim 14, wherein the configuration information further includes a preset number of times, and the method further comprises:

sending an execution result of a target command, wherein the target command comprises the system environment configuration command or the application software configuration command, and the execution result is to indicate a result of executing the target command is successful or failed; and when the execution result indicates the result of executing the target command is failed and a total number of times that the result of executing the target command is failed is less than or equal to the preset number of times, receiving and executing the target command again.

16. The method of claim 15, further comprises:

receiving a verification command; and sending verification information under the control of the verification command, wherein the verification information includes a storage address of the mounted application software, version information for the install pack of the installed application software, and information for the operating system environment.

17. The method of claim 16, wherein the configuration information for the operating system environment includes:

configuration information for a firewall which is to indicate to turn off the firewall, a preset time, and a preset host name, and the system environment configuration command includes at least one of the following:

a command to turn off the firewall which is to instruct the plurality of computers to turn off the firewall, a command to set system time which is to instruct the plurality of computers to set the system time according to the preset time, and a command to modify a host name which is to instruct the plurality of computers to modify the host name according to the preset host name.

18. A non-transitory computer-readable storage medium having computer program stored thereon, which when running on a processor, causes the processor to perform a method for software environment deployment comprising:

receiving configuration information, wherein the configuration information includes configuration information for an operating system environment and configuration information for an application software, wherein the configuration information for the application software includes storage address information for the application software which is to indicate an address at which an install pack of the application software is stored in a remote server;

generating a system environment configuration command according to the configuration information for the operating system environment, wherein the system environment configuration command is to instruct a plurality of computers to configure the operating system environment according to the configuration information for the operating system environment;

generating an application software configuration command according to the configuration information for the application software, wherein the application software configuration command is to instruct the plurality of computers to configure the application software according to the configuration information for the application software, wherein generating the application software configuration command according to the configuration information for the application software includes generating a mount command according to the storage address information, wherein the application software configuration command includes the mount command which is to instruct the plurality of computers to mount the address indicated by the storage address information; and sending the system environment configuration command and the application software configuration command to the plurality of computers.

19. The non-transitory computer-readable storage medium of claim 18, wherein the configuration information further includes network protocol IP address information for the plurality of computers, and the sending the system environment configuration command and the application software configuration command to the plurality of computers includes sending the system environment configuration command and the application software configuration command to the plurality of computers according to the network protocol IP address information for the plurality of computers.

20. The non-transitory computer-readable storage medium of claim 18, wherein the sending the system environment configuration command and the application software configuration command to the plurality of computers includes initiating multiple threads, wherein in each of the multiple threads, sending the system environment configuration command and the application software configuration command to at least one of the plurality of computers.

* * * * *